United States Patent Office 3,016,362
Patented Jan. 9, 1962

3,016,362
BLEND OF A HALOGENATED AROMATIC POLYGLYCIDYL ETHER AND AN ALIPHATIC POLYGLYCIDYL ETHER
Marco Wismer, Gibsonia, Pa., assignor to Pittsburgh Plate Glass Company, a corporation of Pennsylvania
No Drawing. Filed Feb. 8, 1960, Ser. No. 7,099
16 Claims. (Cl. 260—42)

This invention relates to an epoxy resin and it has particular relation to an epoxy resin which is a liquid medium suitable for use in forming castings, sheets, filaments, and other articles having good physical and chemical properties in general and also having good resistance to flame.

It has heretofore been disclosed to react a polyhydric phenol such as p,p'-di(hydroxyphenyl)propane or p,p'-isopropylidene diphenol, also known as Bisphenol A, with epichlorohydrin in approximately stoichiometric amount and in the presence of a hydrogen halide acceptor such as a hydroxide of an alkali metal. The resultant epoxy resin consists primarily of a chain polymer, each molecule of which contains a plurality of repeating units as represented by the parenthetical moieties in the formula:

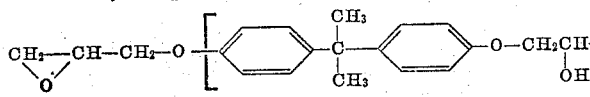
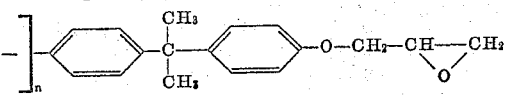

Such a resin can be mixed with curing agents such as polyamines, acid anhydrides or polyamides, and then be cured to an infusible material.

The product is a good resin for many purposes. However, the flame-retardant or flame-resistant characteristics of castings and other forms of such material are not very high. For example, a sheet thereof when ignited by a flame will continue to burn even when the flame is taken away, until it is consumed.

It has also been suggested to form epoxy resins by reaction, in the presence of a hydrogen halide acceptor, of an epihalohydrin with a polyhydric phenol containing halogen substituted for hydrogen in the benzene rings. These materials might be expected to have better flame-retarding properties than more conventional epoxy resins not containing chlorine. It is found, however, that the resultant resins are infusible or, at least, are solids which are not readily adaptable to form castings, laminates, filaments and the like.

This invention comprises the provision of epoxy resin blends or interpolymers which are liquid and are well adapted to be formed into castings, sheets and other bodies that have excellent chemical and physical properties, and additionally, they are retardant to flame. These desirable properties are obtained by forming a composite epoxy resin, either by interpolymerizing the components thereof or preferably, by blending of two epoxy materials (A) and (B). The two resins are termed "polyglycidyl ethers" in the sense that they comprise large amounts of compounds containing epoxy substituted alkoxy side chains, such as those represented in the formula:

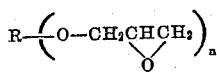

where R in material (A) is a halogenated aromatic and in material (B) is an aliphatic residue, and $n$ is a number from 2 to about 6. They are monomeric in the sense that most of the glycidyl ether groups are joined to the residue of a single polyfunctional hydroxy containing molecule. These monomeric polyethers are obtained by the reaction of large excesses of an epihalohydrin and this molecule.

Polyether (A) comprises as the polyhydroxy component, a halogenated phenol compound containing a plurality of uncondensed benzene rings with at least one hydroxyl group and at least one halogen atom from each ring. Polyether (A) is usually a solid of low melting point.

Polyether (B) comprises as its polyol component an aliphatic polyhydric alcohol containing 2 or more hydroxyls. Polyether (B) is usually a liquid and is quite compatible with solid polyether (A) and when mixed with the latter, provides a liquid product capable of curing to flame-resistant state.

In the formation of the epoxy resins (A) and (B), the ratio of the epihalohydrin is much greater than one mole per reactive hydroxyl in the polyol. For example, it is desirable that the epihalohydrin be employed in a ratio of at least about two moles per equivalent of reactive hydroxyls in the polyol molecule. There is no particular upper limit to the possible excess of the epihalohydrin other than such limit as is imposed by economics. Ratios of 6, 8, or even 10 moles of epihalohydrin per hydroxyl in the polyol component are feasible. Excessive amounts of epihalohydrin, however, do tend to reduce the output of the apparatus and also to increase the costs of epihalohydrin recovery without correspondingly increasing the percentage of monomeric polyol formed in the reaction. Obviously, the intermediate values, such as 3, 4, 5, 6 and 7 moles of epihalohydrin per hydroxyl in the polyol, are also included.

Actually, only about 1 mole of the epihalohydrin per hydroxyl group in the polyol molecule can react, regardless of the amount of the excess of epihalohydrin in the reaction mixture; the rest of the epihalohydrin is distilled off and recovered at the conclusion of the reaction.

Although the excess epihalohydrin does not enter into the reaction with the polyol component, it does have an important effect in that it short-stops the formation of chain molecules which might become insoluble or infusible polymers. The breaking of the epoxy rings with coupling on of added polyether units is to a large extent, though not entirely, inhibited.

Assuming that resin (A) is a monomeric polyether, the group R in the formula represents a halogenated aromatic phenol containing a plurality of phenolic hydroxyl groups. A typical member of this class comprises tetrachloro-p,p'-isopropylidene diphenol.

In resin (B), R represents an aliphatic group containing preferably from about 2 to about 10 carbon atoms. The symbol $n$ is usually a number from about 2 to about 6, dependent upon the number of reactive hydroxyls in the polyfunctional hydroxyl containing molecule.

In forming a polyepoxy resin of the (A) type, various compounds containing a plurality of benzene rings appropriately joined together and containing at least one hydroxyl and at least one halogen atom per benzene ring may be reacted with a large excess of the epihalohydrin. The diphenols of the generalized structure:

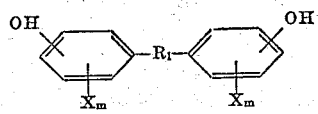

where $R_1$ is an aliphatic hydrocarbon radical from about 1 to about 6 carbon atoms, X is a halogen, e.g., chlorine, bromine, or fluorine, and $m$ is a number from 1 to 4, are especially useful. The tetrachloro-p,p'-isopropylidene diphenol is of the probable formula:

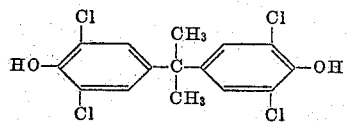

Other positions than ortho (e.g., meta) of the halogen groups with respect to the —OH groups are contemplated. The latter compound may also be termed either 4,4-isopropylidene-bis-(5,6-dichlorophenol) or 2,2-bis(3,5-dichloro-4-hydroxyphenyl)propane. This compound is presently preferred because of commercial availability. Furthermore, it reacts very readily with the epihalohydrin to form the desired product in good yields. The use of the isomers of this compound in which the chlorine atoms are in other positions, is also within the scope of the invention.

The corresponding tetrabromo-substituted p,p'-isopropylidene diphenol, e.g., 4,4-isopropylidene-bis(5,6-dibromophenol), and its isomers react with epihalohydrin to form epoxy resins which, when modified with polyglycidyl ethers of aliphatic polyols, provide products which are liquid and can be poured and cast, but can be cured in conventional manner to hard, durable, flame-resistant state.

It will be apparent that the tetrachloro compound may be replaced by the corresponding dichloro, trichloro, pentachloro or hexachloro compounds which differ from the foregoing tetrachloro-p,p'-isopropylidene diphenol merely in the number of chlorines substituted for hydrogen in the benzene rings. The same is also true of the corresponding bromo-p,p'-isopropylidene diphenols.

Particularly useful aliphatic polyols which may be reacted with epichlorohydrin to form monomeric polyglycidyl ethers of the (B) type under the provisions of the present invention comprise:

TABLE A

Triols such as—
  Trimethylolpropane
  Trimethylolethane
  Trimethylolheptane
Diols such as—
  1,2-propanediol
  1,4-butanediol
Other aliphatic polyols which may be used include—
  Ethylene glycol
  Trimethylene glycol
  2,3-butanediol
  Diethylene glycol
  1,12-di(hydroxyoctadecane)
  1,3-propanediol
  Glycerol
  Diglycerol
  Erythritol
  Pentaerythritol
  Mannitol
  Polyallyl alcohol
and others.

It will be understood that epichlorohydrin appears to be the most readily available of the epihalohydrins which may be used to react with the polyols (chloroaromatic or aliphatic), however, others are not to be excluded. The following constitutes a partial list from which selections may be made:

TABLE B 1-chloro-2,3-epoxy propane (epichlorohydrin)
1-chloro-2,3-epoxy butane
1-chloro-3,4-epoxy butane
2-chloro-3,4-epoxy butane
1-chloro-2-methyl-2,3-epoxy butane
1-bromo-2,3-epoxy pentane
2-chloromethyl-1,2-epoxy butane
1-bromo-4-methyl-3,4-epoxy pentane
1-bromo-4-ethyl-2,3-epoxy pentane
4-chloro-2-methyl-2,3-epoxy pentane
1-chloro-2,3-epoxy octane
1-chloro-2-methyl-2,3-epoxy octane
1-chloro-2-epoxy decane When employed in adequate excess over the theoretical proportions, they react in the presence of hydrochloric acid acceptors, such as sodium hydroxide, with the polyols of either the aromatic or aliphatic types to give large amounts of the desired monomeric polyglycidyl ethers. The proportion of the monomeric polyglycidyl ether formed in the reaction may be, for example, in a range of from about 40 to 90 percent by weight (or even higher) of the total polyether product. These materials, rich in monomeric polyglycidyl ethers of the types (A) and (B), can be blended to form valuable liquid resins that will quickly cure to a hard, strong, flame-resistant state.

Hydrogen halide acceptors for use with the mixtures of polyfunctional hydroxyl containing compounds and epihalohydrins include various basic materials, such as sodium hydroxide, sodium carbonate, or the corresponding potassium compounds. Sodium hydroxide, however, is usually preferred. The base preferably is employed in approximately stoichiometric ratio with respect to the phenolic hydroxyl equivalent. The base employed to receive the hydrogen halide usually is employed in the substantially anhydrous state, though it is not precluded to include water in small amounts. The base is also preferably added in increments in order to avoid any excessively basic conditions in the reaction mixture at any given stage.

The temperature preferably is that of refluxing of the epihalohydrin and evolved water and usually is in a range of about 70° C. to about 100° C.

The reaction may be continued until water ceases to evolve, but usually is continued somewhat longer, e.g., 1 or 2 additional hours, in order to make certain that the reaction is completed and all of the water is removed.

The products of reaction of the polyol (either the halo aromatic or the aliphatic polyol) and the epihalohydrin, when prepared under the foregoing conditions, are exceptionally rich in monomeric polyglycidyl ethers of the formula:

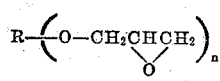

When the reaction has been completed, the salt formed during the reaction may be removed by filtering the reaction mixture. If desired, filtration may be promoted by the use of an appropriate filter aid such as a porous or cellular material, e.g., a product sold under the trade name Celite. Excess epihalohydrin is also removed by distillation, preferably under vacuum. No particular lower range of vacuum is necessary, though preferably it is as low as is practicable. A range of about 10 to 50 mm. of mercury (absolute) is ordinarily satisfactory. The mixture may be distilled to a temperature up to about 120° C. or 150° C.

The aromatic polyglycidyl ether, rich in monomeric polyglycidyl ethers, may also be washed with an aqueous medium for purposes of removing as completely as possible the halogen salts formed during the reaction. The product, after washing, is filtered and dried. Some of the aliphatic polyglycidyl ethers are water soluble and the salts are best removed therefrom by filtering.

The preparation of typical monomeric polyglycidyl ethers suitable for use in the practice of this invention is illustrated in the following examples.

The apparatus employed in these examples will vary in size dependent upon the scale of operations. For small scale operations, a glass flask, preferably equipped with four necks, is convenient. The flask is equipped with a reflux condenser for returning volatilized epihalohydrin, an azeotropic separator, an agitator, a thermometer, and means such as a burner or an electrically heated mantle, for maintaining desired reaction temperature. The same or similar apparatus may be employed in all of the subsequent examples illustrating the preparation of the monomeric polyglycidyl ethers.

Example 1

This example illustrates the preparation of a monomeric polyglycidyl ether which is rich in the diglycidyl ether of tetrachloro-p,p'-isopropylidene diphenol. Epichlorohydrin is employed as the epihalohydrin component. Caustic soda is employed to accept the hydrochloric acid formed.

The reaction charge comprises:

| | Moles |
|---|---|
| Tetrachloro-p,p'-isopropylidene diphenol | 9 |
| Epichlorohydrin | 72.6 |
| Caustic soda (97 percent concentration) | 17.4 |

The tetrachloro-p,p'-isopropylidene diphenol and epichlorohydrin are introduced into the reaction flask and the mixture is heated to reflux temperature (80° C.) under vacuum. The caustic soda is then added in 8 approximately equal portions over a period of 165 minutes. It is observed that upon the first addition of the caustic soda, reaction began immediately, as is evidenced by the fact that the separation of water begins in the azeotropic separator within a period of 2 minutes. When the addition of sodium hydroxide is completed, reaction is continued for a further period of 205 minutes, or until neutral pH is attained. A total of 341 grams of water are removed, as against a theoretical removal of 325 grams. The theoretical value is calculated upon the basis that all of the tetrachloro-p,p'-isopropylidene diphenyl is converted into the monomeric diglycidyl ether.

The excess epichlorohydrin is distilled under a vacuum of about 10 to 20 mm. of mercury (absolute pressure) until a temperature of 90° C. is attained.

The reaction product is then diluted with a mixture comprising 4000 grams of water and 4000 grams of trichloroethylene. The resin solution is washed 10 times with water or until substantially all sodium chloride is removed from the reaction product. The product comprising as its major component the diglycidyl ether of tetrachloro-p,p'-isopropylidene diphenol, remains in the trichloroethylene phase and is recovered by distilling off the latter under a vacuum of 10–20 mm. of mercury (absolute). The temperature is carried up to 150° C.

The product is a yellow, but clear, solid resin. The epoxy equivalent of the product is 292.9. The total chlorine content is 29.7 percent as against a theoretical value of 29.7 percent.

The product is soluble in ketonic solvents, such as acetone or methyl ethyl ketone, with aromatic hydrocarbons, esters, and blends of these solvents. The resin can be melted and blended with monomeric polyglycidyl ethers, such as the diglycidyl ethers of aliphatic diols, to provide liquid blends which can be cast into sheets and other forms and hardened in accordance with the provisions of this invention. Diepoxides obtained by the epoxidation of unsaturated compounds can often be used as diluents.

Example 2

The present example illustrates the preparation of a resin which is a polyglycidyl ether of an aliphatic polyol and being suitable for use as resin (B), for example, in combination with the polyglycidyl ether (A) of Example 1. The polyol of this example is trimethylolpropane of the formula:

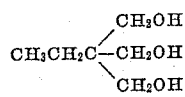

The apparatus of this example essentially corresponds to that of Example 1. The reaction mixture comprises:

| | Grams | Moles |
|---|---|---|
| Trimethylolpropane | 176.6 | 1.31 |
| Epichlorohydrin | 1,495.0 | 16.17 |
| Caustic soda | 160.0 | 4.0 |

The trimethylolpropane and epichlorohydrin are charged into the reaction vessel and the mixture is heated to reflux temperature while it is being stirred. When the reflux temperature is reached, the sodium hydroxide is added in equal increments at 10-minute intervals over a period of 400 minutes. The first evolution of water is observed after the reaction has been in progress for 20 minutes. After the final addition of sodium hydroxide, the reaction is refluxed for an additional 120 minutes. At the conclusion of the latter period, the mixture is slightly basic and is neutralized with 1 milliliter of acetic acid at 69° C. During the course of the reaction, 61 milliliters of water are collected azeotropically.

The mixture is cooled to room temperature and filtered over Celite. A clear, light yellow filtrate is obtained. The excess epichlorohydrin is distilled off under a vacuum of 10 to 20 millimeters of mercury (absolute) to a temperature reaching a maximum of 150° C. About 841.5 grams of epichlorohydrin are recovered by the distillation. The hot resin is mixed with Celite and filtered.

There is obtained a clear, light yellow product in an amount of 318.9 grams. The epoxy equivalent is 141.6. The viscosity at 25° C. is 196 centipoises. This liquid material contains large amounts of the monomeric triglycidyl ether of trimethylolpropane. This material, when mixed with 17 grams of triethylene tetramine per 100 grams of resin, gells in 10 minutes. Subsequently, a violent reaction sets in which spoils the casting. This epoxy compound, by itself, is not a very suitable casting material, however, it is suitable for blending with the diglycidyl ether of tetrachloro-p,p'-isopropylidene diphenol of Example 1 to provide mixtures which, when cured, are stable and fire-resistant.

Example 3

This example illustrates the preparation of material rich in the diglycidyl ether of 1,4-butanediol. This compound is useful for blending with the diglycidyl ethers of tetrachloro-p,p'-isopropylidene diphenol as disclosed in Example 1. The charge comprises:

| | Grams | Moles |
|---|---|---|
| 1,4-butanediol | 288.0 | 3.2 |
| Epichlorohydrin | 2,480.0 | 25.8 |
| Caustic soda | 276.0 | 6.9 |

The 1,4-butanediol and the epichlorohydrin are charged into apparatus as described in the preceding examples and are heated with stirring under a vacuum of 90 to 155 millimeters of mercury (absolute) until reflux temperature is attained. This occurs at about 65° C.

The sodium hydroxide is then added in 18 portions over a period of 270 minutes. The reaction mixture is further stirred for 400 minutes at the same reflux point of 65° C. Vacuum is discontinued and the mixture is stirred at reflux temperature (120–125° C.) for 120 minutes. The reaction mixture at this stage is neutral. Water in an amount of 117 milliliters is collected. The theoretical yield of water is 124 milliliters. The mixture is cooled to room temperature and filtered through a Buchner funnel. A light yellow, clear filtrate is obtained. The excess epichlorohydrin is then distilled until a pot temperature of 150° C. under a vacuum of 10 to 30 millimeters of mercury (absolute) is obtained.

A clear, light yellow product in a yield of 518.6 grams (80.3 percent) is obtained. The product has an epoxy equivalent of 116.7, a viscosity of 10.3 at 25° C. and a Gardner color of 2. This material is also useful for blending with the material of Example 1 to obtain a product which can be cast and hardened into bodies having good physical properties and being fire or flame-retardant.

It is to be understood that the invention is not necessarily limited to the preparation of two distinct monomeric polyglycidyl ethers (A) and (B) which are subsequently blended; it is also feasible concurrently to react a halogenated polyhydric phenol and an aliphatic polyol with an epihalohydrin, such as epichlorohydrin. The resultant polymers do tend to crystallize, but can be fused and will then remain liquid over considerable periods of time, thus permitting them to be cast, extruded, or otherwise formed before they are cured to final state. The following example illustrates the preparation of an interpolymer of tetrachloro-p,p'-isopropylidene diphenol and 1,4-butanediol that can be so cast and cured.

*Example 4*

The reaction mixture, in this instance, comprises:

|  | Grams | Moles |
| --- | --- | --- |
| Tetrachloro-p, p'-isopropylidene diphenol | 366 | 1 |
| 1,4-butanediol | 30 | 0.33 |
| Epichlorohydrin | 993 | 10.7 |
| Caustic soda | 108 | 2.7 |

The tetrachloro-p,p'-isopropylidene diphenol, the 1,4-butanediol and the epichlorohydrin are charged into the reaction vessel equipped as previously described. The mixture is heated to reflux temperature under agitation and under a vacuum of 150 to 200 millimeters of mercury (absolute) and obtains a reflux temperature of 85° C. Upon reaching the reflux temperature, the sodium hydroxide is added in 7 increments over a period of 235 minutes. Water is observed to evolve in a period of 2 minutes after the first increment is added. After the final addition of sodium hydroxide, the reaction is continued for 570 minutes while the pot temperature is maintained at 85° C.; 48 grams of water evolve (theoretical value 48.6 grams.) The mixture is neutral.

The reaction mixture is then filtered twice through a Buchner funnel with the aid of Celite. The epichlorohydrin is distilled from the clear, yellow filtrate at a temperature of 98° C. under a vacuum of 10 to 30 millimeters of mercury (absolute). Final removal of traces of epichlorohydrin is effected by heating to a temperature of about 140° C. under a vacuum of 10 to 25 millimeters of mercury (absolute).

A yield of 404.5 grams of clear, medium-brown material is obtained. The epoxy equivalent of this material is 252.6. The material remains liquid for about 3 days and during this period, it can be used for forming castings which are flame-retardant and have other valuable properties. The material will ultimately solidify, but can be re-melted at a temperature of about 58-70° C. The re-melted material can be mixed with an amine curing agent, cast and cured to form useful castings.

*Example 5*

In this example the polyols are again mixed; trimethylolpropane is employed as the aliphatic polyol. The reaction mixture comprises:

|  | Grams | Moles |
| --- | --- | --- |
| Epichlorohydrin | 1,117.0 | 12.1 |
| Caustic soda (98.3%) | 117.5 | 2.94 |
| Trimethylolpropane | 44.6 | 0.33 |
| Tetrachloro-p,p'-isopropylidene diphenol | 366.28 | 1.0 |

The tetrachloro-p,p'-isopropylidene diphenol, the trimethylolpropane and the epichlorohydrin are charged into the reaction vessel already described; the mixture is stirred while the reaction mixture is heated to reflux temperature of 90–95° C. under a vacuum of 150–200 millimeters of mercury (absolute). When reflux temperature is attained, the sodium hydroxide is added in 8 increments over a period of 170 minutes. The reaction begins within 1 minute, as is evidenced by the evolution of water and is continued for an additional 215 minutes after the last of the sodium hydroxide has been incorporated. At the end of the latter time, the mixture is observed to be neutral. During the course of the reaction, 50.5 grams of water are collected azeotropically.

The reaction mixture is filtered twice through a Buchner funnel with the aid of Celite to obtain a clear, light yellow filtrate. The excess of epichlorohydrin is distilled up to a pot temperature of 150° C. under a vacuum of 10 millimeters of mercury (absolute). The yield is 518.8 grams. The epoxy equivalent is 226. The viscosity of the mixture is somewhat less than that of a liquid epoxy resin which is a commercial product, sold under the trade name of Epon 834.

This material can be mixed until homogeneous with a curing agent such as metaphenylene diamine or an eutectic mixture of metaphenylene diamine and methylene dianiline and cured at elevated temperature to provide a useful plastic having flame-retardant properties.

The blends of (A) the diglycidyl ether of tetrachloro-p,p'-isopropylidene diphenol and (B) polyglycidyl ether of aliphatic polyols may be in various proportions with respect to each other to provide liquid resin which can be mixed with curing or hardening agents and cast or sheeted and cured. The same is also true of the interpolymers from the blends of components.

The proportions of the two types of resins (A) and (B) are susceptible of variation over a relatively broad range. For example, for 4 parts by weight of the aliphatic polyepoxy component (resin (B)), 1 part to 45 parts by weight of the aromatic diepoxy component containing chlorine (resin (A)) may be employed. These proportions apply either to the blends of preformed monomeric epoxides or to the interpolymers of the components thereof.

The conventional curing agents heretofore employed in epoxy resins may be employed in either the blends of resins (A) and (B) or in the single resin in which the components of resins (A) and (B) are directly interpolymerized. Curing agents comprise acid anhydrides, polyamines, polyamides and others. One such curing agent heretofore suggested for epoxy resins is so-called chlorendic anhydride or hexachloroendomethylene tetrahydrophthalic anhydride. This is a solid and from the standpoint of ease of incorporation into the mixture is less desirable than liquid curing agents, such as polyamines, as represented by the eutectic mixtures of metaphenylene diamine and methylene dianiline.

The use of amides and polyamides containing reactive amine groups such as those obtained by reacting a dicarboxylic acid, such as a so-called dimer acid of a glyceride drying oil, e.g., linseed oil and a polyamine, such as ethylene diamine, diethylaminopropyl amine, diethylene triamine or triethylene tetraamine is included within the scope of the invention.

Many other curing agents are recognized in the prior art for use in polyglycidyl ether type resins. These may be used in the compositions disclosed in the present application.

The temperatures of curing the polyether blends of this invention may vary over a relatively broad range, dependent upon the ease of curing of the specific material employed and also upon the activity of the curing agent. For example, the temperature in some instances, may be as low as room temperature, and on the other hand, it may extend up to any value below that at which objectionable decomposition or charring of the resin or its components occurs. Temperatures up to 150 or 200° C. are contemplated.

Time of cure depends, to a great extent, upon the temperature and the activity of the curing agent. It may be a matter of minutes or it may be hours or even a day or two. A range of from 10 minutes to 20 or 30 hours at baking temperatures of 50 to 200° C. is suggested.

The following examples illustrate the preparation of cured bodies from the foregoing glycidyl polyethers:

Example I

In accordance with the provisions of this example, 200 grams of the product rich in the diglycidyl ether of tetrachloro-p,p'-isopropylidene diphenol prepared as in Example 1 is diluted with 126 grams of material rich in the triglycidyl ether of trimethylolpropane as prepared as described in Example 2. The ingredients are mixed until homogeneous and clear. The viscosity of the mixture is 12,000 centipoises at 25° C. The epoxy equivalent is 212.5. Of this liquid resin, 100 grams are then mixed with 23.3 grams of a suitable curing agent, namely p,p'-methylene dianiline.

The liquid mixture is poured into molds and the following curing schedule is applied:

3.5 hours at 50° C.
1 hour at 80° C.
4 hours at 160° C.

For purposes of comparison, castings are also prepared with the same hardener and using the same curing conditions from a commercial epoxy resin sold as Bakelite 2774 and being essentially the diglycidyl ether of Bisphenol A, or p,p'-isopropylidene diphenol and the following tests were conducted upon the two sets of samples:

| Test | Material | Result | | |
|---|---|---|---|---|
| Water Absorption | Bakelite 2774 | 0.171%. | | |
|  | Resin Blend | 0.096. | | |
| Flame Resistance [1] | Bakelite 2774 | Burns and melts more than 100 sec. | | |
|  | Resin Blend | Extinguishes in 30 sec. | | |
| Heat Distortion | Bakelite 2774 | 153.5° C. | | |
|  | Resin Blend | 108° C. | | |
|  |  | Flexure, p.s.i. | Modulus, p.s.i. | |
| Strength at 93° C. | Bakelite 2774 | 11,000 | 3.23×10^5 | |
|  | Resin Blend | 13,900 | 3.56×10^5 | |
| Strength aged 135 hours at 100° C. | Bakelite 2774 | 18,300 | 4.02×10^5 | |
|  | Resin Blend | 19,900 | 6.88×10^5 | |
| Weight loss 135 hours at 100° C. | Bakelite 2774 | 0.218% | | |
|  | Resin Blend | 0.181% | | |
| Weight loss 135 hours at 150° C. | Bakelite 2774 | 0.283% | | |
|  | Resin Blend | 0.140% | | |

[1] In conducting the flame-retarding tests herein referred to, the following procedure is adhered to:
A casting 4½ inches long, 1 inch wide and ⅛ inch thick, is formed. This is held by one end in a clamp and at an angle of 70° to the horizontal. A Bunsen flame is applied to the lower end for 30 seconds and is withdrawn. The time in seconds required for the flame to die out is taken as the measure of flame-retardancy; the shorter this period, the more flame resistant the resin.

It will be observed from the table that the flame-retardant properties of the sheets of the blend of resins as disclosed herein are substantially better than those of the commercial resins. The physical properties are substantially as good as or better than the corresponding physical properties of the commercial resin.

In a further set of tests, laminates comprising woven glass fabric are made up. The components (A) and (B) of the blend are of the same composition above described. The new resins were blended in a proportion of 1 mole of the diglycidyl ether of p,p'-isopropylidene diphenol to 0.85 mole of the triglycidyl ether of the trimethylolpropane.

The resin blend in an amount of 100 grams is catalyzed with 22.8 grams p,p'-methylene dianiline. The catalyzed mixture is employed to impregnate sheets of the glass fabric and 12 thicknesses of the impregnated fabric are laid up in a press. The resultant sandwich is heated in the press at a temperature of 105° C. and under a pressure of 100 p.s.i. for 1 hour. The temperature is then raised to 150° C. for a period of 4 hours. The resultant laminates are strong in tensile strength, flexure and water resistance and also are flame retardant.

Example II

In this example, 100 grams of the polyether of tetrachloro-p,p'-isopropylidene diphenol of Example I are mixed with 50 grams of the triglycidyl ether of trimethylolpropane as previously disclosed, and 6 grams of tricresyl phosphate. To this mixture is added as a curing agent 22.2 grams of p,p'-methylene dianiline per 100 grams of resin. The resin is cast and cured by baking in an oven at 93° C. for 1 hour, 3 hours at 121° C. and 2 hours at 180° C. Strips of the cured resin ⅛ inch thick, 1 inch wide and 8 inches long are ignited by holding a Bunsen flame to an edge thereof for 30 seconds. The strips extinguished themselves in 11 seconds. The material has improved flame resistance.

Other modifiers and resins may be added if desired.

Example III

A 100 gram sample of the interpolymer of Example 4 is mixed with 19 grams of the eutectic mixture of metaphenylene diamine and p,p'-methylene dianiline. The mixture is poured in a mold and cured at 150° C. for 2 hours. The resin obtained is flame resistant and hard. The resin can be used to form flame-resistant panels and other articles.

The castings and laminates as disclosed are of a type useful in many applications such as insulation in electrical installations, for structural parts in the aircraft industry, etc.

Example IV

In this example, diethylene glycol diglycidyl ether is employed as resin (B).

The blend comprises:

|  | Grams |
|---|---|
| Diethylene glycol diglycidyl ether | 18 |
| Tetrachloro-p,p'-isopropylidene diphenol diglycidyl ether | 128 |

The mixture is cured with p,p'-methylene dianiline in an amount of 21.8 grams per 100 grams of the mixture of resins. The curing schedule is:

| Temperature (° C.) | Time (hours) |
|---|---|
| 50 | 3.5 |
| 80 | 1.0 |
| 160 | 4.0 |

The resultant product is a hard, resistant resin which is highly flame retardant, being self-extinguishing within 8 seconds when subjected to the flame test.

It has been observed that the flame-retarding properties of diglycidyl ethers of tetrachloro-p,p'-isopropylidene diphenol, when diluted with aliphatic monoglycidyl ethers are substantially inferior to those of products obtained by diluting the tetrachloro-p,p'-isopropylidene diphenol with corresponding aliphatic polyglycidyl ethers.

For example, 100 parts by weight of the diglycidyl ether of tetrachloro-p,p'-isopropylidene diphenol is blended with 13.7 parts by weight of butyl glycidyl ether.

A 100 gram sample of this blend is catalyzed with 18.5 grams of methylene dianiline. A test strip is cast from this material and is cured by baking. The strip when subjected to flame test, melts and continues to burn, after the flame is removed, until it was consumed.

The following constitute some useful liquid blends of diglycidyl ether of tetrachloro-p,p'-isopropylidene diphenol and aliphatic polyglycidyl ethers. It is to be understood that each blend comprised 100 parts by weight of diglycidyl ether of tetrachloro-p,p'-isopropylidene diphenol:

|  | Parts by Weight | Viscosity (Poises) |
|---|---|---|
| Triglycidyl ether of trimethylolpropane | 38.5 | 890 |
| Do | 48 | 390 |
| Do | 55 | 215 |
| Diglycidyl ether of 1,4-butanediol | 16.7 | 815 |
| Do | 18.8 | 430 |
| Do | 20.3 | 275 |

These liquid blends can be mixed with catalysts as herein disclosed, cast into molds and baked to form hard, chemically resistant and flame retardant articles.

*Example V*

It is to be appreciated that epoxy resins containing as component (A) the bromo-substituted p,p'-isopropylidene diphenol as the polyphenol component or a blend of the bromo-substituted p,p'-isopropylidene diphenol and the corresponding chloro-substituted p,p'-isopropylidene diphenol are of outstanding merit as flame retardant resins, being even better in this respect than the material containing the chloro-derivative as the flame retardant component. To illustrate this fact, a charge of the following is prepared:

| | Grams |
|---|---|
| Tetrachloro - p,p'-isopropylidene diphenol | 495 (2.4 equivalents) |
| Tetrabromo - p,p'-isopropylidene diphenol | 264 (0.91 equivalent) |
| p,p'-Isopropylidene diphenol | 40 (0.35 equivalent) |
| Epichlorohydrin | 1360 (14.7 equivalents) |
| Sodium hydroxide (96.7% concentration) | 151 (3.66 equivalents) |

This mixture is heated at 100° C. for 4.5 hours to evolve 67 milliliters of water, the theoretical amount being 66 milliliters. The pH value of the product is 7.

Excess epichlorohydrin is distilled off with stirring and at a pressure of about 5 to 25 millimeters of mercury (absolute) to a pot temperature of 145° C. The temperature is held for 15 or 20 minutes and the resin is then cooled to 80° C. The resin is washed with 500 milliliters of warm water with stirring and when stirring becomes difficult, the resin is treated with 1000 milliliters of trichloroethylene and is washed repeatedly with 1000 milliliter portions of water until chlorine ions are substantially completely removed. The solution is treated with Celite and filtered under vacuum. The trichloroethylene is distilled under vacuum to obtain the resin.

The yield is 967 grams, as against a theoretical yield of 1001 grams. The percentage yield, therefore, is 95.7 percent by weight. The product is of an epoxy equivalency of 305 grams per equivalent of resin, as against a theoretical epoxy value of 276 grams per epoxy equivalent.

In order to prepare a casting resin, the following blend is provided:

| | Grams |
|---|---|
| Epoxy resin (as above described) | 162.0 |
| Diglycidyl ether of butanediol-1,4 | 27.5 |

The resultant blend is of a viscosity of 19,000 centipoises at 26° C. and an epoxy equivalency of 256.5.

A 110 gram sample of this resin is heated to 60° C. and 21.2 grams of p,p'-methylene dianiline is added as a catalyst.

The catalyzed mixture is poured into a mold and cured for 1 hour at 80° C. at the end of which time the material has gelled. It is then further cured for 4 hours at 160° C. to provide a clear casting.

The results of a series of four flame tests conducted upon samples of this material using substantially the technique already described, are tabulated as follows.

| Test No.: | Extinction time in seconds |
|---|---|
| 1 | 1 |
| 2 | 0 |
| 3 | 3.5 |
| 4 | 0 |

In comparison, a sample of material containing only the corresponding tetrachloro - p,p' - isopropylidene diphenol, extinguishes in about 13 seconds. The latter is very good and quite satisfactory for many applications, but is far below that of the tetrabromo compound.

The foregoing epoxy resin composition is predominantly of tetrachloro-p,p'-isopropylidene diphenol and still the flame resistance was very high thus indicating that the tetrabromo-p,p'-isopropylidene diphenol is effective at quite low concentration. The relative ratio of tetrabromo-p,p'-isopropylidene diphenol to tetrachloro-p,p'-isopropylidene diphenol in the epoxy resins is susceptible of variation over a relatively wide range. For example, percentages of tetrabromo-p,p'-isopropylidene diphenol as low as about 5 percent based upon the tetrachloro-p,p'-isopropylidene diphenol are contemplated. On the other hand, the percentage of the tetrabromo-p,p'-isopropylidene diphenol may be greatly increased and the proportion of the tetrachloro compound correspondingly reduced. The blend of the two may, for example, contain as high as 95 percent by weight of the tetrabromo compound and only 5 percent by weight of the tetrachloro compound. The tetrachloro compound may even be entirely eliminated.

In the foregoing reaction 1,4-butanediol may be replaced by other diols or polyols in the preparation of the aliphatic polyol. Appropriate aliphatic polyols are those heretofore listed in Table A. These may be reacted with any one of the epihalohydrins of Table B, though because of present commercial availability and because of its general efficiency epichlorohydrin is presently preferred.

The epihalohydrin and the aliphatic polyol are mixed with a halogen halide acceptor such as sodium hydroxide in well known manner to provide the desired aliphatic polyglycidyl ether which can be blended with the polyglycidyl ether of tetrabromo-p,p'-isopropylidene diphenol to provide liquid, or readily liquifiable resins which can be mixed with curing agents such as a primary or secondary amine or with a dicarboxylic acid or its anhydride and heated to produce a cure.

The preparation of a flame retardant from the diglycidyl ether of tetrabromo-p,p'-isopropylidene diphenol without the addition of the corresponding tetrachloro compound is shown as follows:

*Example VI*

In this example, the diglycidyl ether of tetrabromo-p,p'-isopropylidene diphenol in an amount of 87.6 parts by weight was mixed with 22.4 parts by weight of the diglycidyl ether of 1,4-butanediol to give a liquid resin of relatively low viscosity (6400 cps. at 25° C.).

To this mixture was added 15½ percent by weight based upon the resins of p,p'-methylene dianiline as a curing agent, and the mixture was heated in a suitable mold to a temperature of 80° C. for 1 hour and was further hardened at 180° C. for 4 hours.

The castings were subjected to tests and the results are as follows:

| | |
|---|---|
| Flame test | Did not ignite in a Bunsen burner in 30 seconds. |
| Flexural strength at room temperature | 24,200 p.s.i. |
| Flexural strength at 94.3° C. | 12,400 p.s.i. |
| Heat distortion | 113° C. |
| Water absorption | 0.106%. |

The material is a good heat, flame and water resistant resin of high strength.

The proportion of the aliphatic polyglycidyl ether with respect to the bromo-substituted p,p'-isopropylidene diphenol or to the mixture thereof with chloro-substituted p,p'-isopyridylidene diphenols susceptible of substantial variation, for example, in a range of about 4 parts by weight of the aliphatic polyglycidyl ether to 1 to 45 parts by weight of the bromo- or of the mixed bromo-chloro-polyglycidyl ethers.

By properly adjusting the proportion of the different types of polyglycidyl ether in the resin mixture, substantially any desired viscosity, and a considerable degree of variation in flame resistance, can be attained.

The forms of the invention as herein described are to be considered as being by way of example. It will be apparent to those skilled in the art that numerous modifications may be made therein without departure from the spirit of the invention or the scope of the appended claims.

This application is a continuation-in-part of my co-pending application, Serial No. 682,095, filed September 5, 1957.

I claim:

1. As a new material, a liquid blend consisting essentially of 1 to 45 parts by weight epoxy resin A and 4 parts by weight of epoxy resin B, both resins being of the formula

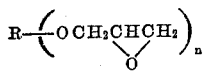

$n$ being a number from 2 to 6 and R in epoxy resin A being of the structure

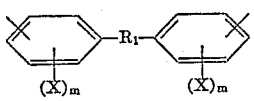

wherein $R_1$ is a saturated aliphatic hydrocarbon group of from 1 to about 6 carbon atoms, X being halogen, $m$ being a number from 1 to 4, R in epoxy resin B being an aliphatic group containing about 2 to 10 carbon atoms.

2. As a new material, a liquid blend consisting essentially of epoxy resins A and B, both being of the formula

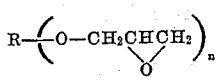

where R in resin A is of the structure

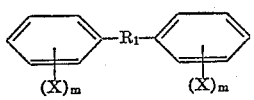

wherein $R_1$ is a saturated aliphatic hydrocarbon radical, each X is halogen, and each $m$ is a whole number from 1 to 4 and R in resin B is aliphatic, $n$ being a number from 2 to 6, there being about 1 to 45 parts by weight of resin A and 4 parts by weight of resin B.

3. As a new material, a liquid blend consisting essentially of epoxy resins A and B, both being of the general formula

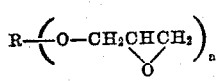

where R in resin A is of the structure

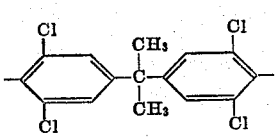

and R in resin B is a saturated aliphatic hydrocarbon radical, $n$ being a number from 2 to 6, the ratios of resins A and B being 4 parts of resin B to 1 to 45 parts of resin A.

4. As a new material, a liquid blend consisting essentially of epoxy resins A and B, both being of the general formula

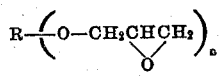

wherein $n$ is a number from 2 to about 6 and where R in resin A is of the structure

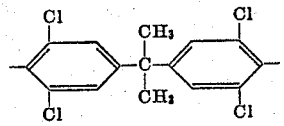

and resin B being of a material predominantly of the class consisting of the triglycidyl ether of trimethylolpropane, triglycidyl ether of trimethylolethane, diglycidyl ether of 1,2-propanediol, diglycidyl ether of 1,4-butanediol, and the diglycidyl ether of diethylene glycol, there being about 1 to 45 parts by weight of resin A to each 4 parts of resin B.

5. A material as defined in claim 4 in which resin B is predominantly the triglycidyl ether of trimethylolpropane.

6. A material as defined in claim 4 in which resin B is predominantly the triglycidyl ether of trimethylolethane.

7. A material as defined in claim 4 in which resin B is predominantly the diglycidyl ether of 1,2-propanediol.

8. A material as defined in claim 4 in which resin B is predominantly the diglycidyl ether of 1,4-butanediol.

9. A material as defined in claim 4 in which resin B is predominantly the diglycidyl ether of diethylene glycol.

10. As a new material adapted to cure to a hard, flame retardant state, a liquid mixture consisting essentially of (A) about 1 to 45 parts by weight of a polyether which is predominantly the diglycidyl ether of tetrachloro-p,p'-isopropylidene diphenol, and (B) about 4 parts by weight of a material which is predominantly the polyglycidyl ether of an aliphatic polyol, the latter ether being of the class consisting of the triglycidyl ether of trimethylolpropane, the triglycidyl ether of trimethylolethane, the diglycidyl ether of 1,2-propanediol, the diglycidyl ether of 1,4-butanediol, and the diglycidyl ether of diethylene glycol.

11. As a new material, the cured, hard, flame retardant interpolymer of the material defined in claim 10.

12. The hard, flame retardant, cured product obtained by adding to the new material defined in claim 10 a hardening agent for epoxy resins and heating the mixture.

13. As a new material, an interpolymer obtained by reacting a mixture consisting essentially of about 1 to 45 parts by weight of tetrachloro-p,p'-isopropylidene diphenol and about 4 parts by weight of an aliphatic polyol of the class consisting of trimethylolpropane, trimethylolethane, 1,2-propanediol, 1,4-butanediol, and diethylene glycol, with 2 to 10 moles of an epihalohydrin in the presence of a base reactive to neutralize hydrochloric acid evolved in the reaction, said interpolymer being adapted to cure to a hard, flame retardant state.

14. As a new material, a liquid blend consisting essentially of epoxy resins A and B, both being of the formula

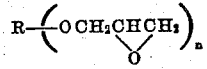

$n$ being a number from 2 to 6 and R in resin A being of the structure

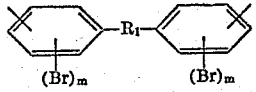

wherein $R_1$ is a saturated aliphatic hydrocarbon radical, each $m$ being a whole number from 1 to 4, and R in resin B being aliphatic and containing about 2 to 10 carbon atoms, there being about 1 to 45 parts by weight of resin A to 4 parts by weight of resin B.

15. As a new material, a liquid blend consisting essentially of resins A and B, both being of the general formula

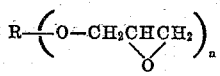

n being a number from 2 to 6 and R in resin A being of the structure

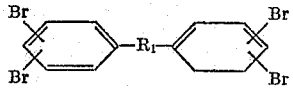

$R_1$ being a hydrocarbon group of 1 to 6 carbon atoms and R in resin B being a saturated aliphatic hydrocarbon of about 2 to 10 carbon atoms, there being about 1 to 45 parts by weight of resin A to 4 parts by weight of resin B.

16. As a new material, a liquid blend consisting essentially of epoxy resins A and B, both being of the general formula

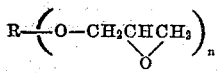

wherein n is a number from 2 to about 6 and where R in resin A is of the structure

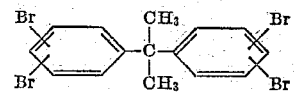

and resin B being of a material predominantly of the class consisting of the triglycidyl ether of trimethylolpropane, triglycidyl ether of trimethylolethane, diglycidyl ether of 1,2-propanediol, diglycidyl ether of 1,4-butanediol, and the diglycidyl ether of diethylene glycol, there being about 1 to 45 parts by weight of resin A to each 4 parts of resin B.

References Cited in the file of this patent

UNITED STATES PATENTS

| | | |
|---|---|---|
| 2,254,904 | Moss | Sept. 2, 1941 |
| 2,548,447 | Shokal et al. | Apr. 10, 1951 |
| 2,801,227 | Goppel | July 30, 1957 |
| 2,824,083 | Parry et al. | Feb. 18, 1958 |

FOREIGN PATENTS

| | | |
|---|---|---|
| 629,111 | Great Britain | Sept. 13, 1949 |